United States Patent
An (10) Patent No.: US 9,432,071 B2
(45) Date of Patent: Aug. 30, 2016

(54) SMART PHONE HOLDER FOR VEHICLE

(71) Applicants: Hyundai Motor Company, Seoul (KR); Kia Motors Corporation, Seoul (KR)

(72) Inventor: Jaehyun An, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 98 days.

(21) Appl. No.: 14/557,274

(22) Filed: Dec. 1, 2014

(65) Prior Publication Data

US 2015/0333789 A1    Nov. 19, 2015

(30) Foreign Application Priority Data

May 14, 2014  (KR) .................. 10-2014-0057983

(51) Int. Cl.
```
H04M 1/00      (2006.01)
H04B 1/3877    (2015.01)
H04B 1/3822    (2015.01)
H04M 1/04      (2006.01)
B60R 11/02     (2006.01)
F16M 11/04     (2006.01)
F16M 13/00     (2006.01)
F16M 13/02     (2006.01)
B60R 11/00     (2006.01)
```

(52) U.S. Cl.
CPC ......... *H04B 1/3877* (2013.01); *B60R 11/0241* (2013.01); *F16M 11/041* (2013.01); *F16M 13/00* (2013.01); *F16M 13/022* (2013.01); *H04B 1/3822* (2013.01); *H04M 1/04* (2013.01); *B60R 2011/0005* (2013.01); *B60R 2011/0075* (2013.01)

(58) Field of Classification Search
CPC .. H04M 1/04; H04M 1/6041; H04M 1/6075; H04M 1/72527; H04M 1/06; H04M 1/0254; H04M 1/0274
USPC ......... 455/575.9, 569.2, 569.1, 575.1, 575.6, 455/90.3, 550.1, 344, 345, 346, 572, 573; 379/455, 446, 454, 426, 330, 420.04; 320/114, 115
See application file for complete search history.

(56) References Cited

U.S. PATENT DOCUMENTS 8,224,408 B2    7/2012  Tomasini et al.
2006/0105819 A1  5/2006  Liao
(Continued)

FOREIGN PATENT DOCUMENTS

DE    20 2014 101 032 U1    5/2014
FR    2 902 383 A3    12/2007
KR    20-2000-0010145 U    6/2000
(Continued)

*Primary Examiner* — Keith Ferguson
(74) *Attorney, Agent, or Firm* — Morgan, Lewis & Bockius LLP (57) ABSTRACT

A smart phone holder may include a docking portion formed on a panel in a vehicle cabin and provided with an electric terminal, a supporter detachably mounted on the docking portion and provided with a power pin corresponding to the electric terminal, a cradle provided with a rear surface mounted on a front surface of the supporter, a supporting cradle disposed at an end of the cradle and configured to support an end of a smart phone, a moving unit mounted in the cradle, and configured to slide the supporting cradle from or to the end of the cradle corresponding to a size of the smart phone, and a charging unit mounted in the other end portion of the cradle to be rotatable to a front surface of the cradle and provided with a charging connector inserted in a charging terminal formed on the other end of the smart phone.

20 Claims, 6 Drawing Sheets

(56) References Cited

U.S. PATENT DOCUMENTS

2011/0143583 A1* 6/2011 Zilmer .................. H04M 1/04
439/529
2013/0223003 A1 8/2013 Carnevali

FOREIGN PATENT DOCUMENTS

| KR | 20-0261161 Y1 | 1/2002 |
|---|---|---|
| KR | 10-0625699 B1 | 9/2006 |
| KR | 10-2013-0012746 A | 2/2013 |

* cited by examiner

SMART PHONE HOLDER FOR VEHICLE

CROSS-REFERENCE TO RELATED APPLICATION

The present application claims priority to Korean Patent Application No. 10-2014-0057983 filed on May 14, 2014, the entire contents of which is incorporated herein for all purposes by this reference.

BACKGROUND OF THE INVENTION

1. Field of the Invention

The present invention relates to a smart phone holder for a vehicle. More particularly, the present invention relates to a smart phone holder for a vehicle that can change a charging connector according to various charging terminals of smart phones and can hold the smart phones regardless of a gap due to a thickness of a protection cover when the protection cover is used.

2. Description of Related Art

Generally, smart phones are must-have electric devices and may be often used when driving a vehicle. In this regard, a smart phone holder for a vehicle is manufactured and sold.

The smart phone holder is used to cause a driver to speak with someone or to manipulate the smart phone easily when the driver is behind the wheel for driving the vehicle.

Conventional smart phone holders are attached to a panel such as a dashboard by using adhesive or are attached to a vehicle windshield by using an adhesion plate.

In a case that the smart phone holder is attached to the panel of the vehicle by using the adhesive, however, adhesion performance may be deteriorated as time passes or adhesion ingredient remains on the panel of the vehicle if the user removes the adhesive and appearance of a vehicle cabin is bad. In addition, the panel of vehicle may be damaged when removing the remaining adhesive.

In addition, in a case that the smart phone holder is attached to the vehicle windshield by using the adhesion plate, the smart phone holder may be separated from the vehicle windshield if performance of the adhesion plate is deteriorated. Therefore, the smart phone fixed to the smart phone holder may be impacted and broken, or impedes the driver when the driver drives the vehicle. In addition, an additional power jack should be connected to a power line so as to charge the smart phone held on the smart phone holder.

Recently, as a display of the smart phone increases, visibility is getting better for utilizing navigation or internet-based APPs and usage of the smart phone also increases. Therefore, necessity of the smart phone holder for holding the smart phone in the vehicle is growing.

Since an additional mounting portion for mounting the smart phone holder does not exist in a conventional vehicle, however, the smart phone holder should be mounted on the dashboard or the windshield of the vehicle by using the adhesive or the adhesion plate. Therefore, it is very difficult to mount the smart phone holder in the vehicle and to hold smart phones having various shapes and sizes in the vehicle.

In addition, the power jack should be connected to the smart phone through the additional power line so as to charge the smart phone. Further, since the power line is exposed to the exterior, appearance of the vehicle cabin gets worse.

Since various charging terminals having various shapes and sizes are manufactured depending on various manufacturers, various charging connectors according to types of the smart phones should be manufactured. Therefore, cost increases and it is very difficult to use the smart phone holder in common for various smart phones.

In a case that the protection cover is mounted on the smart phone, the charging connector may not be completely inserted into the charging terminal. Therefore, the smart phone may be mounted on the holder after the protection cover is uncovered from the smart phone.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a smart phone holder for a vehicle having advantages of being mounted through a docking portion on a center fascia panel, replacing a charging connector according to a smart phone and a charging terminal that can have various sizes and shapes according to each manufacturer, and holding the smart phone in common regardless of a gap with the charging terminal due to thickness of a protection cover.

A smart phone holder for a vehicle according to an aspect of the present invention may include a docking portion formed on a panel in a vehicle cabin and provided with an electric terminal, a supporter detachably mounted on the docking portion and provided with a power pin corresponding to the electric terminal on a lower surface thereof, a cradle provided with a rear surface mounted on a front surface of the supporter, a supporting cradle disposed at an end of the cradle and adapted to support an end of a smart phone, a moving unit mounted in the cradle, and adapted to slide the supporting cradle from or to the end of the cradle corresponding to a size of the smart phone, and a charging unit mounted in the other end portion of the cradle so as to be rotatable to a front surface of the cradle and provided with a charging connector that can be inserted in a charging terminal formed on the other end of the smart phone.

The moving unit may include first and second sliders slidable along rail grooves formed in a length direction in the cradle and apart from each other and provided with an end connected to the supporting cradle and the other end, a guide rod being integrally formed with the other end of each of the first and second sliders, first elastic members interposed between each of the first and second sliders and the cradle in a state of wrapping each guide rod of the first and second sliders and applying elastic force to the first and second sliders, a damper mounted at the other portion of the first slider in the cradle and adapted to control moving speed of the first slider, and an ascending/descending unit slidable upwardly or downwardly at a center portion in the cradle and provided with an end portion protruded to the exterior of the cradle, the end portion being adapted to support a lower surface of the smart phone.

Each of the first and second sliders may be prevented from being departed from and may slide along the rail grooves by guiders formed corresponding to the rail grooves at the center portion in the cradle.

Gear teeth may be formed at the other end portion of the first slider corresponding to the damper in the length direction.

A rotating gear corresponding to the gear teeth may be mounted at the damper and may engage with the gear teeth.

A plurality of first notches may be formed at the other end portion of the second slider evenly in the length direction.

The cradle may be provided with a first locker at a corresponding position to the first notches, and the first locker may be protruded from the cradle toward an upper exterior, may be slidable upwardly or downwardly, and may be adapted to restrict movement of the second slider by being caught in the first notches.

A plurality of first engaging protrusions may be formed at a side portion of the first locker corresponding to the first notch such that the first locker is locked when the first engaging protrusions are inserted into the first notches and the first locker is unlocked from the first notches when a user pushes the other end portion of the first locker protruded toward the upper exterior.

A second elastic member may be interposed between an end of the first locker facing the first slider and a supporting block formed in the cradle.

The ascending/descending unit may include an ascending/descending slider disposed at a front portion in the cradle and slidable upwardly or downwardly, a third elastic member mounted at a rear portion in the cradle and adapted to apply elastic force to the ascending/descending slider, a plurality of second notches formed at a side of the ascending/descending slider in a length direction of the ascending/descending slider, a second locker slidable in the length direction of the cradle at a position corresponding to the second notches and provided with a plurality of second engaging protrusions at a side corresponding to the second notches so as to restrict movement of the ascending/descending slider by the second engaging protrusions selectively inserted into the second notches, and a fourth elastic member interposed between the cradle and the second locker so as to apply elastic force to the second locker.

An antislip member may be mounted on an upper surface of a lower portion of the ascending/descending slider corresponding to a lower surface of the smart phone.

The supporter may include a body provided with the power pin at a lower surface corresponding to the docking portion, a release button provided at an upper surface of the body, and at least one fixing hook slidable at the lower surface of the body according to operation of the release button and adapted to be inserted into a hook groove formed at the docking portion so as to fix the lower surface of the body to the docking portion.

The power pin may penetrate through the body and may be electrically connected to a connecting terminal formed in the cradle through a wire.

An antislip member may be mounted at an interior surface of the supporting cradle corresponding to the smart phone.

The charging unit may include a housing having both ends hinged to an interior of the other end of the cradle so as to be rotatably inserted in the cradle, a fifth elastic member applying elastic force to the charging connector movably mounted toward the charging terminal of the smart phone in the housing, and a connecting connector connected to the charging connector through a wire at an exterior of the housing and coupled to a connecting terminal connected to the power pin through a wire in the cradle.

The charging connector may be slidably mounted in the housing in the length direction of the cradle.

A rear cover may be detachably mounted at a rear portion of the other end portion of the cradle where the charging unit is mounted.

A stopper may be protruded from an interior surface of the rear cover corresponding to a rear end of the charging connector such that a rear end of the charging connector is caught by the stopper and rotating range of the housing is restricted when the charging unit rotates toward the front of the cradle.

The charging connector may be replaceably mounted to the housing.

A cover instead of the supporter may be detachably mounted to the docking portion.

The smart phone holder for a vehicle according to an aspect of the present invention can be mounted in a vehicle through a docking portion on a center fascia panel. Additional power lines can be removed from the smart phone holder by receiving electric power through an electric terminal included in the docking portion. Therefore, appearance of a vehicle cabin may be improved.

In addition, since a supporting cradle is movable according to a size of a smart phone through a moving unit which can move in a length direction of the smart phone, the smart phone holder can be used for the smart phones having various shapes and sizes.

Further, since charging connectors are replaceable according to charging terminals of the smart phones having various sizes and shapes, a driver may not purchase a smart phone holder according to the charging terminal of the smart phone.

In addition, even though the protection cover is mounted on the smart phone, the smart phone may be stably connected to a charging unit through a movable charging connector. Furthermore, since the charging unit is rotatably mounted at a cradle, the smart phone may be easily held on the smart phone holder. Therefore, usability and convenience may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

It is to be understood that exemplary embodiments described in this specification and the drawings are just some exemplary embodiments of the present invention and do not represent all the exemplary embodiments of the present invention, and thus various modifications and equivalent arrangements may exist in the filing date of the present invention.

Description of components that are not necessary for explaining the present exemplary embodiment will be omitted, and the same constituent elements are denoted by the same reference numerals in this specification.

Since size and thickness of each component illustrated in the drawings are arbitrarily represented for ease of explanation, the present invention is not limited to the drawings. Thicknesses of many parts and regions are enlarged.

In addition, unless explicitly described to the contrary, the word "comprise" and variations such as "comprises" or "comprising", will be understood to imply the inclusion of stated elements but not the exclusion of any other elements.

In addition, terms such as "unit", "means", "portion", and "member", described in this specification mean a set of components or any component that can perform at least one specific function or operation.

Figure 1A:
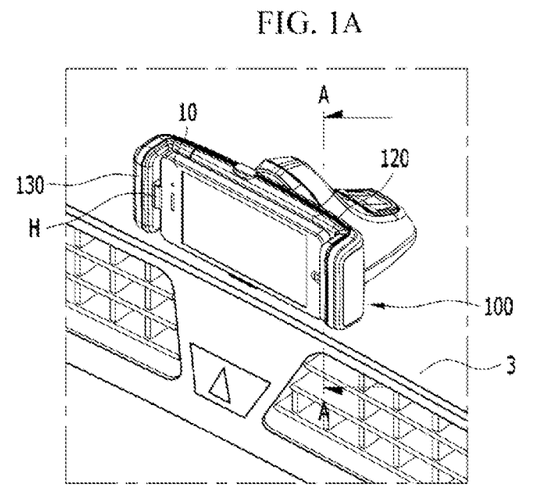
FIGS. 1A, 1B and 1C are schematic diagrams of a smart phone holder for a vehicle according to an exemplary embodiment of the present invention that is mounted at the vehicle.
Figure 1B:
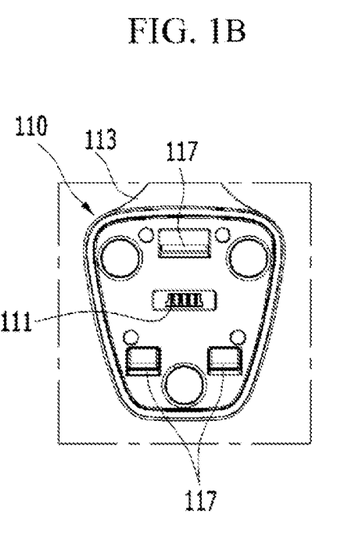
Figure 1C:
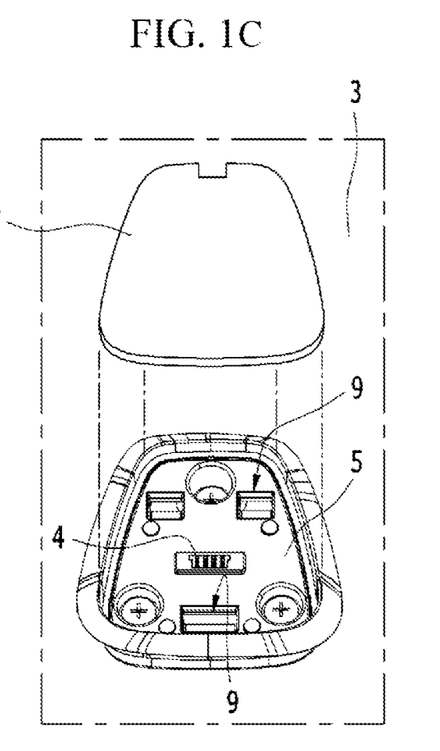
Figure 2:
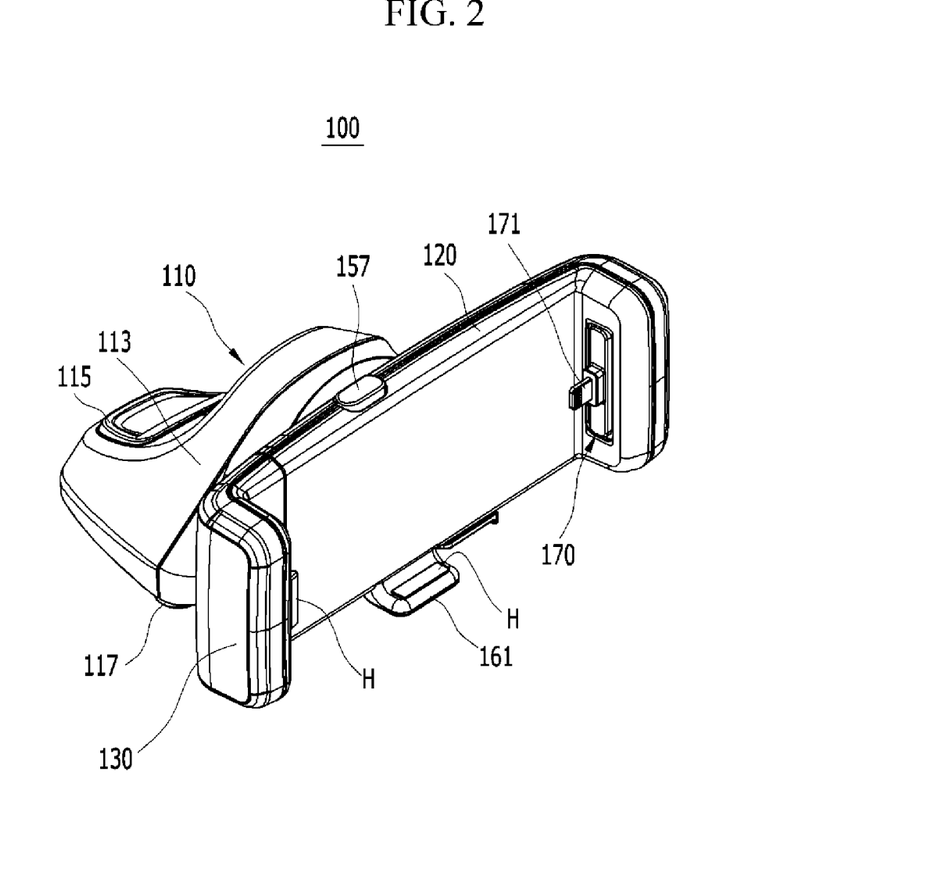
FIG. 2 is a perspective view of a smart phone holder for a vehicle according to an exemplary embodiment of the present invention.
Figure 3:
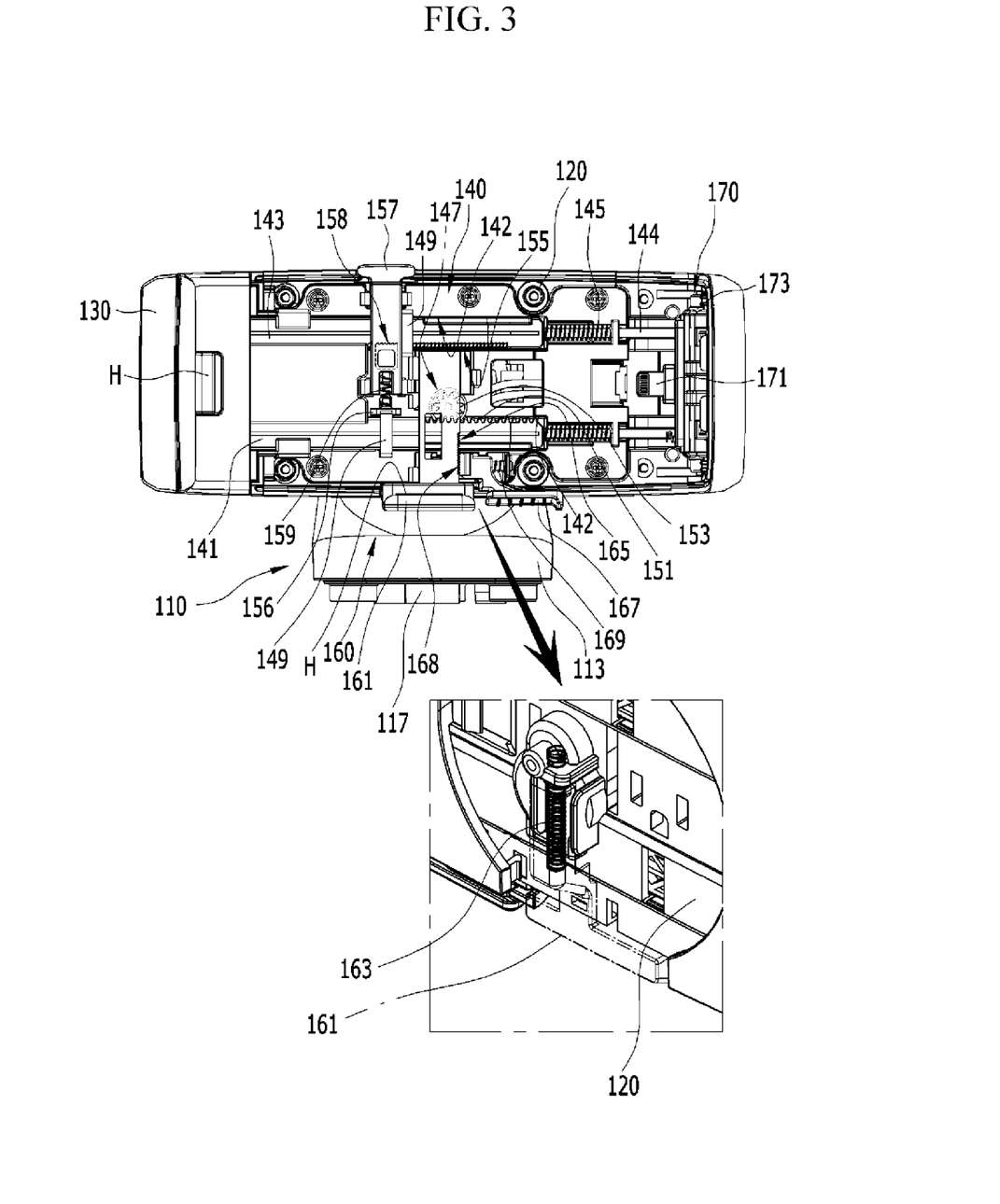
FIG. 3 is a schematic diagram of a moving unit applicable to a smart phone holder for a vehicle according to an exemplary embodiment of the present invention.
Figure 4A:
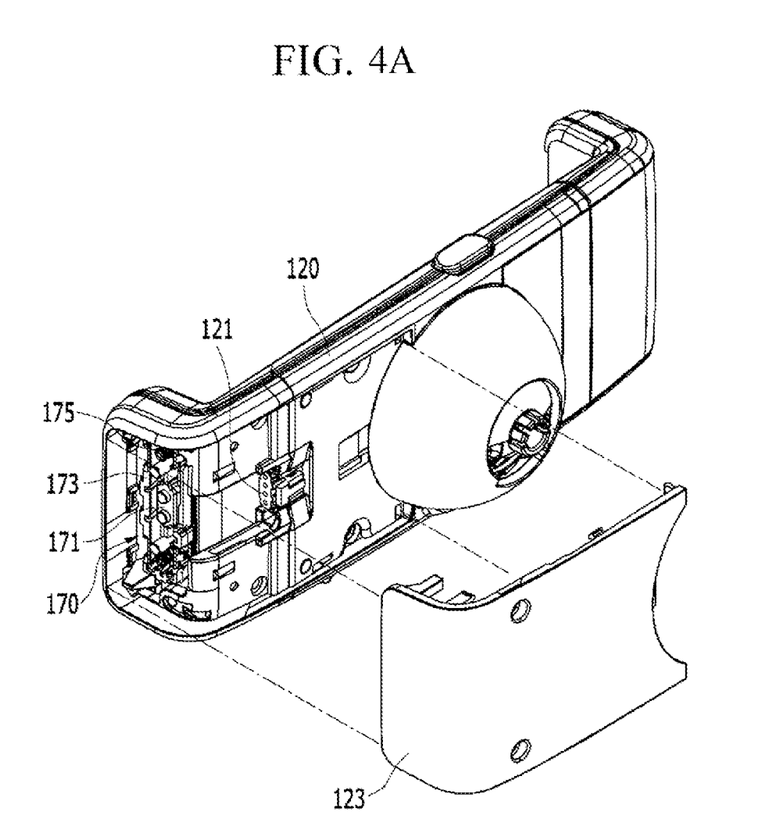
FIGS. 4A and 4B are perspective views of a charging unit applicable to a smart phone holder for a vehicle according to an exemplary embodiment of the present invention.
Figure 4B:
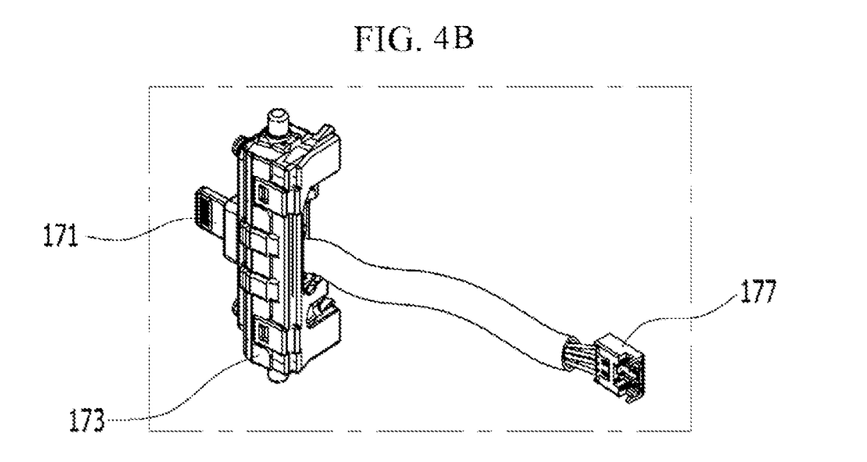
Figure 5:
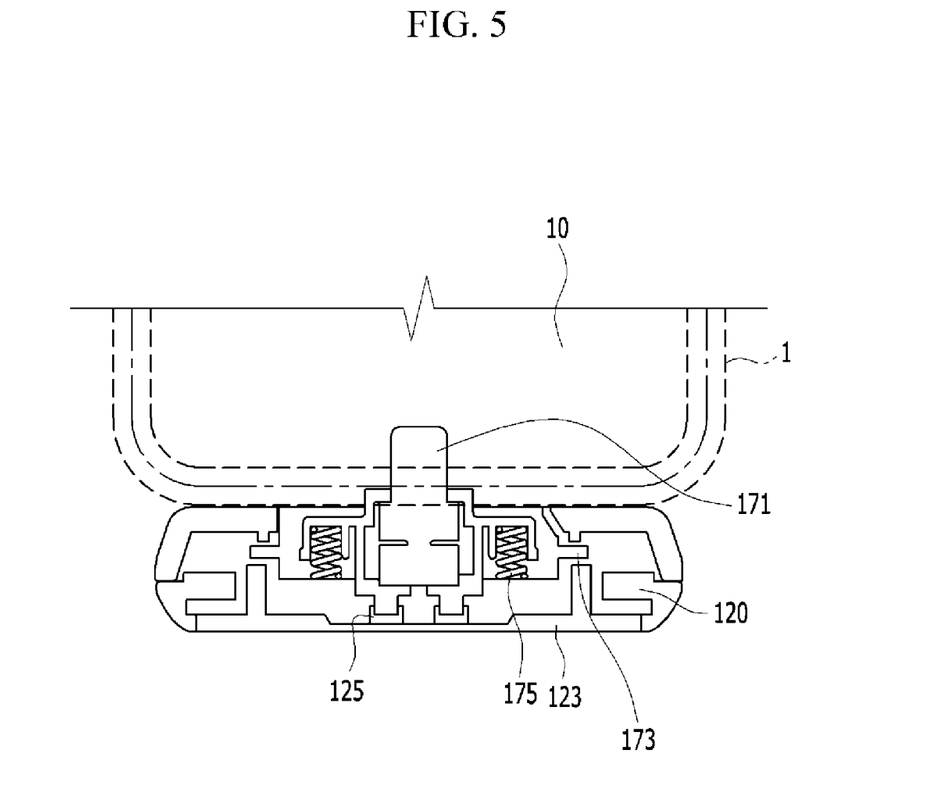
FIG. 5 is a cross-sectional view taken along the line A-A in FIG. 1A.

FIGS. 1A, 1B and 1C are schematic diagrams of a smart phone holder for a vehicle according to an exemplary embodiment of the present invention that is mounted at the vehicle, FIG. 2 is a perspective view of a smart phone holder for a vehicle according to an exemplary embodiment of the present invention, FIG. 3 is a schematic diagram of a moving unit applicable to a smart phone holder for a vehicle according to an exemplary embodiment of the present invention, FIGS. 4A and 4B are perspective views of a charging unit applicable to a smart phone holder for a vehicle according to an exemplary embodiment of the present invention, and FIG. 5 is a cross-sectional view taken along the line A-A in FIG. 1A.

Referring to the drawings, a smart phone holder 100 for a vehicle according to an exemplary embodiment of the present invention can be directly mounted to the vehicle through a docking portion 5 formed at a center fascia panel 3, can replace a charging connector 171 according to a smart phone 10 and a charging terminal having various sizes and shapes, and can hold the smart phone regardless of a gap with the charging terminal due to thickness of a protection cover 11.

For this purpose, the smart phone holder 100 for a vehicle according to the exemplary embodiment of the present invention, as shown in FIG. 1A to FIG. 3, is mounted on the docking portion 5 formed at the center fascia panel 3 in a vehicle cabin and provided with an electric terminal 4. The smart phone holder 100 includes a supporter 110, a cradle 120, a supporting cradle 130, a moving unit 140 and a charging unit 170.

Herein, a cover 7 can be detachably mounted at the docking portion 5 when the supporter 110 is detached from the docking portion 5. The cover 7 prevents inflow of dust or foreign material into the electric terminal 4 and prevents the electric terminal 4 from being exposed from the center fascia panel 3.

That is, a user detaches the cover 7 from the docking portion 5 when the smart phone holder 100 will be mounted on the docking portion 5. On the contrary, the user mounts the cover 7 on the docking portion 5 when the smart phone holder 100 is not mounted on the docking portion 5.

In the present exemplary embodiment, the supporter 110 is detachably mounted on the docking portion 5 and has a power pin 111 corresponding to the electric terminal 4 at a lower surface thereof The 'lower surface' of the supporter 110 means a surface corresponding to the docking portion 5, an 'upper surface' of the supporter 110 means the surface opposite to the 'lower surface', and a 'front surface' of the supporter 110 means a surface where the cradle 120 is mounted in this specification.

The supporter 110 includes a body 113, a release button 115 and a fixing hook 117.

The body 113 has the power pin 111 at the lower surface corresponding to the docking portion 5.

Herein, the power pin 111 may penetrates through an inside of the body 113 and may be electrically connected to a connecting terminal 121 provided in the cradle 120 through a wire.

The release button 115 is provided at the upper surface of the body 113, and at least one fixing hook 117 is provided and is slidable at the lower surface of the body 113 according to operation of the release button 115.

The fixing hook 117 is inserted into a hook groove 9 formed at the docking portion 5 and fixes the lower surface of the body 113 on the docking portion 5.

For example, three fixing hooks 117 may be disposed in a predetermined triangle shape enclosing the power pin 111. It is exemplified in this specification but is not limited that three fixing hooks 117 are provided. The number and arrangement of fixing hooks 117 may be selected according to design scheme of a designer.

In the present exemplary embodiment, a lower surface of the cradle 120 is mounted on the front surface of the supporter 110. The cradle 120 can rotate horizontally and vertically.

That is, a center of the rear surface of the cradle 120 has a hemispherical shape and is mounted on the front surface of the body 113 of the supporter 110. Therefore, a driver or a user can selectively rotate the cradle 120 about the supporter 111 and change an angle of the smart phone according to his view.

The supporting cradle 130 is disposed at an end of the cradle 120 and supports an end of the smart phone 10.

Herein, an antislip member H may be mounted on an interior surface of the supporting cradle 130 corresponding to the smart phone 10.

The antislip member H is made of rubber material. The antislip member H causes the end of smart phone 10 to be stably held on the supporting cradle 130 and prevents the smart phone 10 from being detached from the supporting cradle 130 by absorbing vibration or impact occurring when the vehicle runs.

As shown in FIG. 3, the moving unit 140 is mounted in the cradle 120 and slides the supporting cradle 130 from or to the end of the cradle 120 according to a size of the smart phone 10.

Herein, the moving unit 140 includes first and second sliders 141 and 143, a first elastic member 145, a damper 147 and an ascending/descending unit 160.

Each of the first and second sliders 141 and 143 can slidably mounted along rail grooves 142 formed in a length direction of the cradle 120 and apart from each other. One end of each slider 141 or 143 is connected to the supporting cradle 130 and the other end of each slider 141 or 143 is integrally formed with a guide rod 144.

Each of the first and second sliders 141 and 143 is prevented from departed from the rail grooves 142 and slides along the rail grooves 142 by guiders 149 formed corresponding to the rail grooves 142 at a center portion in the cradle 120.

In the present exemplary embodiment, each of the first elastic members 145 is interposed between each of the first and second sliders 141 and 143 and the cradle 120 in a state of wrapping each guide rod 144 of the first and second sliders 141 and 143 and applies elastic force each of the first and second sliders 141 and 143.

Herein, each of the first elastic members 145 may be a coil spring wrapping each guide rod 144 of the first and second sliders 141 and 143. One end of each first elastic member 145 is supported by each of the first and second sliders 141 and 143 and the other end of each first elastic member 145 is supported by the cradle 120.

The first elastic members 145 applies elastic force to the first and second sliders 141 and 143 so as to slide the first and second sliders 141 and 143 along the rail grooves 142 in the cradle 120. That is, the first elastic members 145 apply elastic force to the first and second sliders 141 and 143 so as to move the supporting cradle 130 away from the cradle 120.

The damper 147 is mounted at the other end portion of the first slider 141 in the cradle 120 and controls moving speed of the first slider 141.

Herein, gear teeth 151 may be formed at the other end portion of the first slider 141 corresponding to the damper 147 in a length direction of the first slider 141.

In addition, a rotating gear 153 is rotatably mounted at the damper 147 corresponding to the gear teeth 151 and the rotating gear 153 engages with the gear teeth 151.

Therefore, when the first slider 141 slides by the elastic force of the first elastic member 145, the first slider 141 can slide on the rail groove 142 smoothly by the damper 147 having the rotating gear 153 engaged with the gear teeth 151.

In the present exemplary embodiment, a plurality of first notches 155 are formed at the other end portion of the second slider 143 evenly in the length direction.

In addition, the cradle 120 is further provided with a first locker 157 at a corresponding position to the first notches 155. The first locker 157 is protruded from the cradle 120 toward an upper exterior, is slidable upwardly or downwardly, and is adapted to restrict movement of the second slider 143 by being caught in the first notches 155.

A plurality of first engaging protrusions 158 is formed at a side portion of the first locker 157 corresponding to the first notch 155. Therefore, the first locker 157 is locked when the first engaging protrusions 158 are inserted into the first notches 155, and is unlocked from the first notches 155 if a user pushes the other end portion of the first locker 157 protruded toward the upper exterior.

A second elastic member 159 is interposed between an end of the first locker 157 facing the first slider 141 and a supporting block 156 formed in the cradle 120. The second elastic member 159 applies elastic force to the first locker 157 in order to push the first locker 157 upwardly.

The second elastic member 159 applies the elastic force to the first locker 157 so as to protrude the first locker 157 to the exterior of the cradle 120 in a state that the end of the second elastic member 159 is supported by the supporting block 156. Therefore, the plurality of first engaging protrusions 158 can engage with the first notches 155.

If a user pushes the first locker 157, the first and second sliders 141 and 143 are moved toward the end of cradle 120 by the first elastic members 145 and the supporting cradle 130 moves away from the cradle 120.

At this state, a user pushes the supporting cradle 130 toward the other end of the cradle 120 so as for the supporting cradle 130 to contact with the end of the smart phone 10.

In this case, the first engaging protrusions 158 of the first locker 157 is engaged with the first notches 155 by the elastic force of the second elastic member 159 in a state that the antislip member H of the supporting cradle 130 contacts with the smart phone 10. Therefore, the supporting cradle 130 is fixed to the cradle 120.

The end portion of the smart phone 10 is fixed to the supporting cradle 130 in front of the cradle 120 through this operation.

In addition, the ascending/descending unit 160 is slidably mounted in the center portion of the cradle 120 independent of the first and second sliders 141 and 143. An end portion of the ascending/descending unit 160 protruded to the exterior of the cradle 120 is adapted to support a lower surface of the smart phone 10.

The ascending/descending unit 160 includes an ascending/descending slider 161, a third elastic member 163, a second notch 165, a second locker 167 and a fourth elastic member 169.

The ascending/descending slider 161 is disposed at a front portion in the cradle 120 and is slidable upwardly or downwardly in a state that the lower end of the ascending/descending slider 161 is protruded to the lower exterior of the cradle 120.

Herein, an antislip member H is mounted on an upper surface of a lower portion of the ascending/descending slider 161 corresponding to the lower surface of the smart phone 10.

The antislip member H is made of rubber material. The antislip member H causes the lower surface of the smart phone 10 to be stably held on the ascending/descending slider 161 and prevents the smart phone 10 from being detached from the ascending/descending slider 161 by absorbing vibration or impact occurring when the vehicle runs.

In the present exemplary embodiment, the third elastic member 163 is mounted at a rear portion in the cradle 120 and is adapted to apply elastic force to the ascending/descending slider 161.

The third elastic member 163 may be a coil spring. One end of the third elastic member 163 is supported by the rear portion of the cradle 120 and the other end of the third elastic member 163 is supported by an upper portion of the ascending/descending slider 161.

The second notches 165 is formed at a side of the ascending/descending slider 161 in a length direction of the ascending/descending slider 161.

In the present exemplary embodiment, the second locker 167 is slidable in the length direction of the cradle 120 at a position corresponding to the second notches 165 and is provided with a plurality of second engaging protrusions 168 at a side of the second locker 157 corresponding to the second notches 165.

The second locker 167 restricts movement of the ascending/descending slider 161 by the second engaging protrusions 168 selectively inserted into the second notches.

In addition, the fourth elastic member 169 is interposed between the cradle 120 and the second locker 167 and applies elastic force to the second locker 167.

The fourth elastic member 169 may be a coil spring. One end of the fourth elastic member 169 is supported by the second locker 167 and the other end of the fourth elastic member 169 is supported by the inside of the cradle 120.

That is, if the plurality of second engaging protrusions 168 formed at the side of the second locker 167 is inserted into the second notches 165 formed at the ascending/descending slider 161 by the elastic force of the fourth elastic member 169, the second locker 167 is locked on the ascending/descending slider 161 and restricts the movement of the ascending/descending slider 161.

If the ascending/descending slider 161 is to be unlocked for moving the cradle 120 downwardly, a user moves the second locker 167 toward the opposite side of the second notch 165 and the second engaging protrusions 168 are disengaged from the second notches 165. In this case, the ascending/descending slider 161 slides to the lower portion of the cradle 120 by the elastic force of the third elastic member 163.

If the ascending/descending slider 161 moved to the lower portion of the cradle 120 is moved to an original position, a user pushes the ascending/descending slider 161 protruded from the cradle 120 toward the upper portion of the cradle 120 with suitable force.

In this case, the ascending/descending slider 161 moves upwardly in a state that the second notches 165 contact with the second engaging protrusions 168. At this time, the fourth elastic member 169 absorbs movement of the second locker 167 generated by the second notches 165 and the second engaging protrusions 168.

That is, the fourth elastic member 169 absorbs the movement of the second locker 167 occurring when the ascending/descending slider 161 returns to the original position, and applies elastic force to the second locker 167 so as to fix the ascending/descending slider 161. Therefore, the plurality of second engaging protrusions 168 are engaged with the second notches 165 by the fourth elastic member 169.

In addition, the charging unit 170 is rotatable toward the front surface of the cradle 120 and is mounted in the other end portion of the cradle 120. The charging unit 170 can be detached from the cradle 120. The charging unit 170 is provided with a charging connector 171 inserted into a charging terminal formed at the other end of the smart phone 10 so as to fix the other end of the smart phone 10 to the cradle 120 and charge a battery in the smart phone 10 by supplying power supplied from the electric terminal 4 to the smart phone 10.

The charging unit 170, as shown in FIG. 4A and FIG. 5, includes a housing 173, a fifth elastic member 175 and a connecting connector 177.

The housing 173 has both ends hinged to an interior of the other end of the cradle 120 and is rotatably inserted in the cradle 120.

The fifth elastic member 175 applies elastic force to the charging connector 171 movably mounted toward the charging terminal of the smart phone 10 in the housing 173.

The fifth elastic member 175 may be a coil spring. One end of the fifth elastic member 175 is supported by an inside of the housing 173 and the other end of the fifth elastic member 175 is supported by the charging connector 171.

In addition, the connecting connector 177 is connected to the charging connector 171 through a wire at an exterior of the housing 173 and is coupled to a connecting terminal 121 connected to the power pin 111 through a wire in the cradle 120.

Herein, a part of the charging connector 171 inserted into the charging terminal can be slide in the housing 173 in the length direction of the cradle 120.

Shapes and sizes of the charging connectors 171 may vary according to the charging terminals of the smart phones 10 having different shapes and sized according to manufacturers and types.

That is, each charging unit 170 may be provided with a specific charging connector 161 corresponding to a specific charging terminal of each smart phone 10 having different shape and size according to manufacturers. Therefore, the charging unit 170 can be replaceably mounted at the cradle 120 so as to meet the charging terminal of the smart phone 10 used by a user.

In the present exemplary embodiment, a rear cover 123 is detachably mounted at a rear portion of the other end portion of the cradle 120 where the charging unit 170 is mounted.

A stopper 125 is integrally protruded from an interior surface of the rear cover 123 corresponding to a rear end of the charging connector 171. If the charging unit 170 rotates toward the front surface of the cradle 120, a rear end of the charging connector 171 is caught by the stopper 125 and rotating range of the housing is restricted.

Figure 6A:
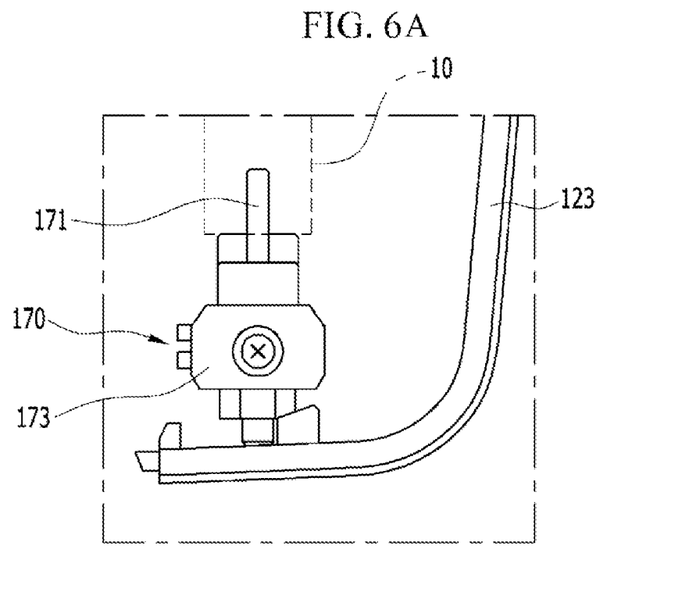
FIGS. 6A and 6B are schematic diagrams which illustrate operation of a charging unit in a smart phone holder for a vehicle according to an exemplary embodiment of the present invention.
Figure 6B:
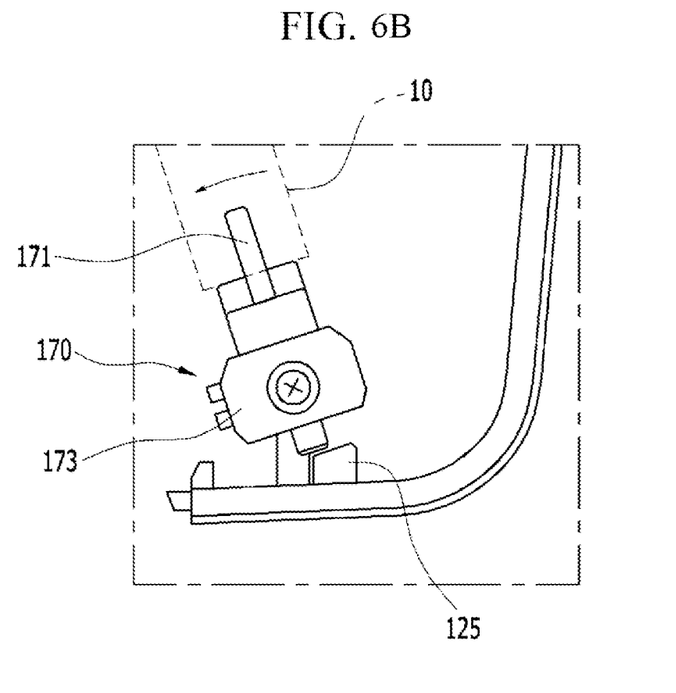

FIGS. 6A and 6B are schematic diagrams which illustrates operation of a charging unit in a smart phone holder for a vehicle according to an exemplary embodiment of the present invention.

In a case that the smart phone 10 is mounted, the charging unit 170, as shown at FIG. 6A, is disposed in parallel with the stopper 125 of the rear cover 123.

Herein, if the protection cover 11 is mounted on the smart phone 10, the charging connector 171 is moved toward the rear cover 123 in the housing 173. At this time, the rear end of the charging connector 171 is supported by the interior surface of the rear cover 123.

If the smart phone 10 is held at the smart phone holder 100, as shown at FIG. 6B, a user firstly inserts the charging connector 171 into the charging terminal of the smart phone 10. At this time, the housing 173 may rotate toward the front surface of the cradle 120 by a predetermined angle.

Herein, the stopper 125 contacts with the lower end of the charging connector 171 rotated by the housing 173 and restricts rotation of the charging connector 171 by the predetermined angle. Therefore, rotation of the housing 173 of the charging unit 170 is also restricted by the predetermined angle.

At this time, a user may insert the charging terminal of the smart phone 10 easily into the charging connector 171 rotating toward the front surface of the cradle 120 by the predetermined angle.

After the charging terminal of the smart phone 10 is inserted into the charging connector 171, a user rotates the end portion of the smart phone 10 toward the supporting cradle 130. Thereby, the charging unit 170 returns to the original position, as shown at FIG. 6A.

That is, since the charging unit 170 is rotatably mounted at the other end in the cradle 120, a user can connect the charging terminal of the smart phone 10 to the charging connector 171 easily. In addition, since the rotation of the charging unit 170 is restricted by the stopper 125 provided at the rear cover 123, usability and convenience may be improved.

The smart phone holder 100 for a vehicle according to the exemplary embodiment of the present invention can be mounted in the vehicle through the docking portion 5 on the center fascia panel 3. Additional power lines can be removed from the smart phone holder 100 by receiving electric power through the electric terminal 4 included in the docking portion 5. Therefore, appearance of a vehicle cabin may be improved.

In addition, since the supporting cradle 130 is movable according to the size of the smart phone 10 through the moving unit 140 which can move in the length direction of the smart phone 10, the smart phone holder 100 can be used for the smart phones 10 having various shapes and sizes.

Further, since charging connectors are replaceable according to charging terminals 171 of the smart phones 10 having various sizes and shapes, a driver may not purchase a smart phone holder 100 according to the charging terminal of the smart phone 10.

In addition, even though the protection cover 11 is mounted on the smart phone 10, the smart phone 10 may be stably connected to a charging unit 170 through a movable charging connector 171. Furthermore, since the charging unit 170 is rotatably mounted at a cradle 120, the smart phone 10 may be easily held on the smart phone holder 100. Therefore, usability and convenience may be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A smart phone holder for a vehicle comprising:
    a docking portion formed on a panel in a vehicle cabin and provided with an electric terminal;
    a supporter detachably mounted on the docking portion and provided with a power pin corresponding to the electric terminal on a lower surface thereof;
    a cradle provided with a rear surface mounted on a front surface of the supporter;
    a supporting cradle disposed at an end of the cradle and configured to support an end of a smart phone;
    a moving unit mounted in the cradle, and configured to slide the supporting cradle from or to the end of the cradle corresponding to a size of the smart phone; and
    a charging unit mounted in another end portion of the cradle to be rotatable to a front surface of the cradle and provided with a charging connector that is inserted in a charging terminal formed on another end of the smart phone.

2. The smart phone holder of claim 1, wherein the moving unit comprises:
    first and second sliders slidable along rail grooves formed in a length direction in the cradle and apart from each other and provided with an end connected to the supporting cradle and another end, a guide rod being integrally formed with another end of each of the first and second sliders;
    first elastic members interposed between each of the first and second sliders and the cradle in a state of wrapping each guide rod of the first and second sliders and applying elastic force to the first and second sliders;
    a damper mounted at another portion of the first slider in the cradle and configured to control moving speed of the first slider; and
    an ascending/descending unit slidable upwardly or downwardly at a center portion in the cradle and provided with an end portion protruded to an exterior of the cradle, the end portion being configured to support a lower surface of the smart phone.

3. The smart phone holder of claim 2, wherein each of the first and second sliders is prevented from being departed from and slides along the rail grooves by guiders formed corresponding to the rail grooves at the center portion in the cradle.

4. The smart phone holder of claim 2, wherein gear teeth are formed at another end portion of the first slider corresponding to the damper in the length direction.

5. The smart phone holder of claim 4, wherein a rotating gear corresponding to the gear teeth is mounted at the damper and engages with the gear teeth.

6. The smart phone holder of claim 2, wherein a plurality of first notches are formed at another end portion of the second slider evenly in the length direction.

7. The smart phone holder of claim 6, wherein the cradle is provided with a first locker at a corresponding position to the first notches, and the first locker is protruded from the cradle toward an upper exterior, is slidable upwardly or downwardly, and is configured to restrict movement of the second slider by being caught in the first notches.

8. The smart phone holder of claim 7, wherein a plurality of first engaging protrusions are formed at a side portion of the first locker corresponding to the first notch such that the first locker is locked when the first engaging protrusions are inserted into the first notches and the first locker is unlocked from the first notches when a user pushes another end portion of the first locker protruded toward the upper exterior.

9. The smart phone holder of claim 7, wherein a second elastic member is interposed between an end of the first locker facing the first slider and a supporting block formed in the cradle.

10. The smart phone holder of claim 2, wherein the ascending/descending unit comprises:
    an ascending/descending slider disposed at a front portion in the cradle and slidable upwardly or downwardly;
    a third elastic member mounted at a rear portion in the cradle and configured to apply elastic force to the ascending/descending slider;
    a plurality of second notches formed at a side of the ascending/descending slider in a length direction of the ascending/descending slider;

a second locker slidable in the length direction of the cradle at a position corresponding to the second notches and provided with a plurality of second engaging protrusions at a side corresponding to the second notches to restrict movement of the ascending/descending slider by the second engaging protrusions selectively inserted into the second notches; and a fourth elastic member interposed between the cradle and the second locker to apply elastic force to the second locker.

11. The smart phone holder of claim 10, wherein an antislip member is mounted on an upper surface of a lower portion of the ascending/descending slider corresponding to a lower surface of the smart phone.

12. The smart phone holder of claim 1, wherein the supporter comprises:

a body provided with the power pin at a lower surface corresponding to the docking portion;

a release button provided at an upper surface of the body; and at least one fixing hook slidable at the lower surface of the body according to operation of the release button and configured to be inserted into a hook groove formed at the docking portion to fix the lower surface of the body to the docking portion.

13. The smart phone holder of claim 12, wherein the power pin penetrates through the body and is electrically connected to a connecting terminal formed in the cradle through a wire.

14. The smart phone holder of claim 1, wherein an antislip member is mounted at an interior surface of the supporting cradle corresponding to the smart phone.

15. The smart phone holder of claim 1, wherein the charging unit comprises:

a housing having both ends hinged to an interior of the another end of the cradle to be rotatably inserted in the cradle;

a fifth elastic member applying elastic force to the charging connector movably mounted toward the charging terminal of the smart phone in the housing; and a connecting connector connected to the charging connector through a wire at an exterior of the housing and coupled to a connecting terminal connected to the power pin through a wire in the cradle.

16. The smart phone holder of claim 15, wherein the charging connector is slidably mounted in the housing in the length direction of the cradle.

17. The smart phone holder of claim 15, wherein a rear cover is detachably mounted at a rear portion of the another end portion of the cradle where the charging unit is mounted.

18. The smart phone holder of claim 17, wherein a stopper is protruded from an interior surface of the rear cover corresponding to a rear end of the charging connector such that a rear end of the charging connector is caught by the stopper and rotating range of the housing is restricted when the charging unit rotates toward the front of the cradle.

19. The smart phone holder of claim 1, wherein the charging connector is replaceably mounted to the housing.

20. The smart phone holder of claim 1, wherein a cover instead of the supporter is detachably mounted to the docking portion.

* * * * *